United States Patent Office 3,748,292
Patented July 24, 1973

3,748,292
CORROSION RESISTANT PRIMER COATING FOR ALUMINUM SURFACES CONTAINING STRONTIUM CHROMATE AND MAGNESIUM POWDER
Arthur Stander, Jenkintown, Pa., assignor to the United States of America as represented by the Secretary of the Navy
No Drawing. Filed Jan. 18, 1972, Ser. No. 218,818
Int. Cl. C08g 51/02
U.S. Cl. 260—18 PN                                     1 Claim

ABSTRACT OF THE DISCLOSURE

The present invention relates to a unique aircraft primer composition which provides improved corrosion protection under prolonged exposure to severe salt and water environments. The primer composition consists of strontium chromate and finely divided magnesium powder in a vehicle consisting of a condensation product of epichlorohydrin and Bisphenol A having an average molecular weight of 900 and a polyamide resin having an amide value of 210–240, a viscosity of 500–750 poises at 40° C. and a specific gravity of 0.99.

---

The invention described herein may be manufactured and used by or for the Government of the United States of America for governmental purposes without the payment of any royalties thereon or therefor.

Various primer formulations which include metal powder ingredients have been used heretofore to protect metal surfaces from the corrosive effects of extreme atmospheric and weather conditions. More specifically, zinc dust has been successfully used in primer formulations to protect steel surfaces from corrosion. No known metal containing powder has been successfully used heretofore, however, to provide suitable high corrosion resistance on aluminum surfaces.

It is therefore a principal object of the invention to provide a novel and improved metallic powder primer formulation which provides effective corrosion protection on aluminum surfaces.

It is a further object of the invention to provide a novel and improved primer formulation in which strontium chromate and finely divided magnesium powder in an epoxy-polyamide resin vehicle produce a synergistic corrosion protective effect.

These and other objects of the invention are accomplished by preparing a unique primer coating formulation which includes the following ingredients in the following proportions by weight:

Ingredient: Parts by weight
An epoxy resin (Shell 1001) _____ 25–30
A polyamide resin (Versamid 115) _____ 7.5–10.5
First anti-corrosive pigment _____ 25–30
Second anti-corrosive pigment _____ 25–30

The epoxy resin which is employed in the formulation and which is one of the ingredients of the vehicle of the formulation is a condensation product of epichlorohydrin and Bisphenol A. It has a melting point at 65–75° C., a viscosity (40% in butyl Carbitol, diethyleneglycol monobutyl ether) of 1.0–1.7 poises at 20° C., an epoxide equivalent of 450–550, an average molecular weight of 900 and has the following chemical structural formula:

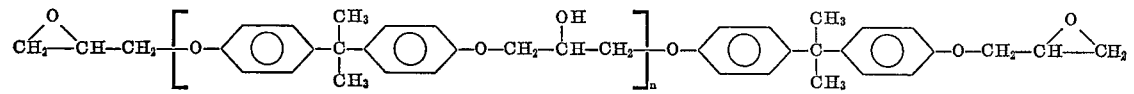

The polyamide resin, which is the other ingredient of the vehicle of the formulation, is a linseed oil acid amide. It has an amide value of 210–240, a viscosity of 500–750 poises at 40° C. and a specific gravity of 0.99.

The anti-corrosive pigments which are used in the formulation are strontium chromate and finely divided (325 mesh) magnesium powder.

In the preparation of the formulation, the strontium chromate and the finely divided magnesium powder are stirred into a suitably thinned vehicle of approximately 65% of the epoxy resin and 35% of the polyamide resin. The maximum amount of metal which could be incorporated in the formulation and still provide a film of reasonable integrity is used. The primer formulation is applied to the surface to be protected as soon as possible after its preparation since its shelf life does not exceed approximately 24 hours.

The following specific example of the formulation is intended to illustrate the invention but not limit it in any way:

EXAMPLE 27 grams of strontium chromate and 27 grams of finely divided (325 mesh) magnesium powder were stirred into 27 grams of the epoxy resin (Shell 1001) and 9 grams of the polyamide resin (Versamid 115). Two parts by volume of the intermixture was then thinned with one part by volume of a 50% toluene and 50% methyl isobutyl ketone solution.

A plurality of test panels were fabricated from a corrosion susceptible aluminum alloy material. Each panel contained three cadmium plated steel fasteners. Without any preliminary surface treatment, the panels were coated with the primer formulation as well as other anti-corrosive primers presently known and used in the art. Without the application of a topcoat coating, each of the panels was then exposed to a 5% salt and $SO_2$ spray (6 bubbles per minute from a ⅜" tube) two hours a day for three months. Results of the test showed that the panels coated with the formulation of the above described example exhibited very little corrosion and no blistering whereas panels coated with the conventional protective coatings corroded and blistered in varying degrees of severity.

Obviously, many modifications and variations of the present invention are possible in the light of the above teachings. It is therefore to be understood that within the scope of the appended claim, the invention may be practiced otherwise than as specifically described.

What is claimed is:
1. A curable aluminum primer coating composition comprising:
 (a) 25 to 30 parts by weight of a condensation product of epichlorohydrin and Bisphenol A, having the following formula:

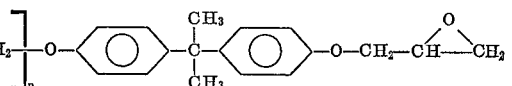

said condensation product having a melting point of 65°–75° C., a viscosity, 40% in diethyleneglycol monobutyl ether, of 1.0–1.7 poises at 20° C., an epoxide equivalent of 450–550 and an average molecular weight of 900:
 (b) 7.5 to 10.5 parts by weight of a polyamide resin which is a linseed oil acid amide having an amide value of 210–240, said polyamide resin has a viscosity of 500–750 poises at 40° C. and a specific gravity of 0.99;
(c) 25 to 30 parts by weight of strontium chromate; and
(d) 25 to 30 parts by weight of magnesium.

References Cited

UNITED STATES PATENTS

| | | | |
|---|---|---|---|
| 3,408,318 | 10/1968 | Madison | 260—37 |
| 3,427,190 | 2/1969 | Murdock | 260—37 |
| 3,578,615 | 5/1971 | Moore et al. | 260—18 |
| 3,352,810 | 11/1967 | McLay et al. | 260—37 |
| 3,598,659 | 8/1971 | Kingler et al. | 117—132 |
| 3,660,523 | 5/1972 | Grawe et al. | 117—132 |

DONALD E. CZAJA, Primary Examiner

E. C. RZUCIDLO, Assistant Examiner

U.S. Cl. X.R.

117—130 R, 132 BE; 260—18 EP, 37 EP, 37 M, 830 P